United States Patent [19]

Whitten

[11] 3,754,567

[45] Aug. 28, 1973

[54] BALL LOCK CONTROL VALVE

[75] Inventor: David E. Whitten, Northridge, Calif.

[73] Assignee: Air-Dry Corporation of America, Northridge, Calif.

[22] Filed: May 30, 1972

[21] Appl. No.: 257,700

[52] U.S. Cl............... 137/509, 137/516.27, 251/76
[51] Int. Cl............................................. F16k 31/12
[58] Field of Search................... 137/474, 508, 509, 137/516.27, 494; 251/76, 83

[56] References Cited
UNITED STATES PATENTS

| | | | |
|---|---|---|---|
| 2,351,190 | 6/1944 | Carlson | 137/516.27 X |
| 3,040,772 | 6/1962 | Todd | 137/509 |
| 3,073,338 | 1/1963 | Cholvin | 137/509 X |

Primary Examiner—Harold W. Weakley
Attorney—Robert C. Comstock

[57] ABSTRACT

A control valve in which a valve seat is engaged by a closure member carried by a poppet. The poppet is mounted within a surrounding piston. A plurality of balls disposed around the periphery of the poppet engage larger circular openings in the piston to provide a limited amount of longitudinal movement of the poppet within the piston. A poppet return spring urges the closure member toward the valve seat. A strong pressure reference spring engages the piston, but its pressure is exerted against the valve body and not against the valve seat. Since the valve seat is not subjected to high pressure, it may be made narrow and sharp and only a small pressure differential is required to move the closure member from seating to sealing position.

8 Claims, 3 Drawing Figures

BALL LOCK CONTROL VALVE

BACKGROUND OF THE INVENTION

1. Field of the invention

The invention relates to a ball lock control valve which requires a minimum amount of seating force.

2. Description of the Prior Art

A control valve which is operated by or subjected to high pressure forces customarily requires a wide valve seat which is capable of withstanding such high forces. A wide valve seat requires high reseat forces for sealing, which is effected by a large crack to reseat pressure differential. Excessively high seat wear unnecessarily results from the high pressure acting upon the valve seat.

SUMMARY OF THE INVENTION

The invention provides a control valve in which the high pressure reference spring force is taken out in valve structure other than the valve seat, with only the minimum amount of pressure being applied directly to the valve seat. A floating poppet which is isolated from the high pressure requires only a minimum amount of crack to reseat pressure differential. This permits use of a relatively narrower and sharper valve seat, with a reduced amount of seat wear for longer life.

It is accordingly the primary object of the invention to provide a control valve structure having the advantages and benefits set forth above and described hereinafter in this specification.

Another object of the invention is to provide a control valve which requires a minimum amount of reseat force to seal and which accordingly permits the use of a narrower and sharper valve seat which is more easily lapped for sealing.

A further object of the invention is to provide such a valve control which has less seat wear and which accordingly has a longer universal life.

It is another object of the invention to provide a device of the class described which is simple in its structure and operation, which utilizes a small number of parts and which requires a minimum of assembly and adjusting time.

Yet another object of the invention is to provide a valve structure in which a metal to metal seat may be used, and which may also be used with seats of other materials.

Another object is to provide such a device in which the number of seals required is substantially reduced.

In one embodiment of the invention, the device is externally adjustable over a substantially wide range of cracking pressures.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE PREFERRED EMBODIMENT

Figure 1:
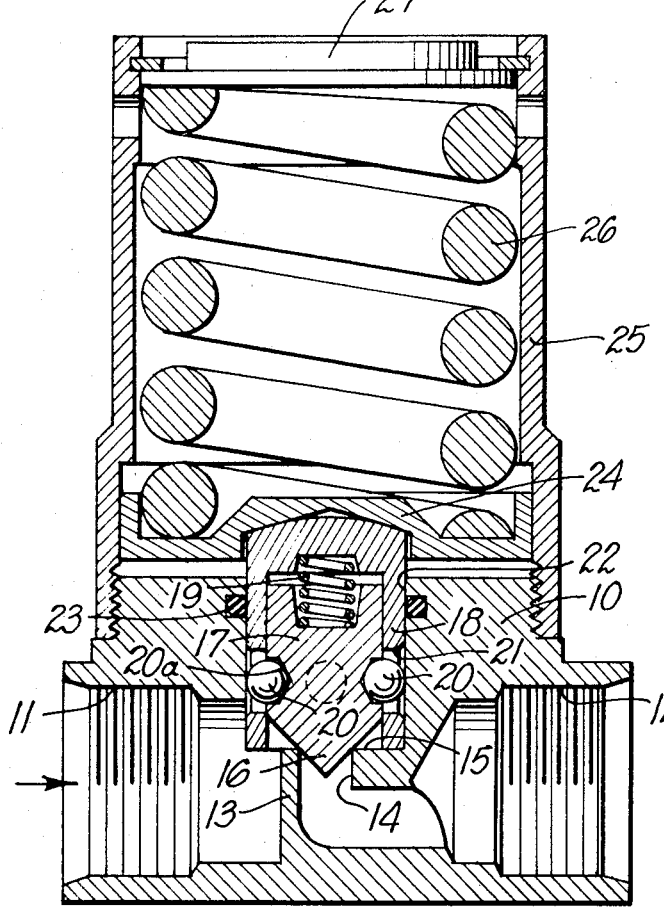
FIG. 1 is a longitudinal sectional view of a control valve constructed in accordance with this invention, with the poppet and piston closed.
Figure 2:
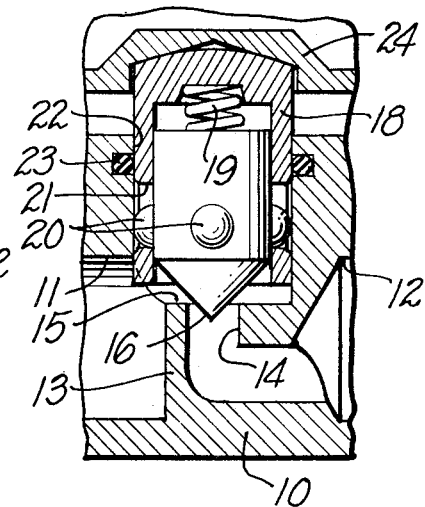
FIG. 2 is a similar partial sectional view showing the poppet and piston in open position.

A preferred embodiment which has been selected to illustrate my invention comprises a valve body 10 having on one end thereof an internally screw threaded inlet 11 and at the other end thereof an internally screw threaded outlet 12, to which appropriate connections may be made.

The inner end of the inlet 11 is closed at its lower portion by a vertically directed wall 13, the upper portion being open and adapted to connect with a passage 14 leading to the outlet 12. The upper end of the passage 14 carries a valve seat 15, which is normally closed off by a conical closure member 16, which comprises the lower end of a poppet 17.

The poppet 17 is mounted for longitudinal (vertical in the drawings) reciprocal movement within a surrounding piston 18. A poppet reference spring 19 extends between the upper end of the poppet 17 and the adjacent portion of the piston 18. The spring 19 normally urges the poppet downwardly against the valve seat 15 to close off the passage 14.

A plurality of balls 20 are mounted in recesses 20a formed in the sides of the poppet 17. In the embodiment shown in the drawings, four balls 20 are utilized. The balls 20 protrude beyond the outer periphery of the poppet 17 and their outer portions extend into circular openings 21 formed in the lower portion of the piston 18. The openings 21 are of somewhat greater diameter than the balls 20. This permits a limited amount of longitudinal movement of the poppet 17 within the piston 18.

The balls 20 are free to rotate and thereby provide an extremely low friction connection between the poppet 17 and piston 18. It would be possible, however, to use other suitable forms of connection between these elements, such as pins, protuberances, etc.

The piston 18 is slidably mounted within a vertically directed port 22 extending through the upper portion of the valve body 10 directly above the passage 14. An O-ring 23 provides a moving seal between the piston 18 and the walls of the port 22.

The upper end of the piston 18 fits within a crown-shaped recess formed in the center of an annular cup 24. The cup 24 is mounted for limited vertical movement within the lower portion of a housing 25, which is threadedly secured to the upper portion of the valve body 10.

The housing 25 contains a large pressure reference spring 26, the lower portion of which engages and exerts downward pressure against the cup 24. The upper end of the spring 26 is held in place at the top of the housing 25 by a cap 27.

The device is shown in closed position in FIG. 1 of the drawings, with the bottom of the piston 18 being held against the portion of the valve body 10 surrounding the passage 14 by pressure from the pressure reference spring 26.

The closure member 16 comprising the lower end of the poppet 17 is in closed sealing engagement with the valve seat 15 surrounding the upper end of the passage 14. The balls 20 are disposed adjacent to the center of the openings 21 because the poppet 17 cannot move any further downwardly with respect to the piston 18 because of the engagement between the closure member 16 and valve seat 15.

An increase in the inlet pressure occurring at the inlet 11 acts on the area defined by the port 22, less the area defined by the valve seat 15.

When the inlet pressure increases sufficiently to overcome the force of the pressure reference spring 26, the piston 18 is raised a short distance upwardly. As the piston 18 moves upwardly, the balls 20 are engaged by the lower edges of the openings 21 in the piston 18. This is the limit of possible upward movement of the piston 18 with respect to the poppet 17.

Further upward movement of the piston 18 results in upward movement of the poppet 17 caused by the engagement of the balls 20 with the piston 18. As the poppet 17 is moved upwardly, the closure member 16 is lifted off the valve seat 15 and flow passes from the inlet 11 through the passage 14 to the outlet 12.

When the inlet pressure is reduced, the pressure reference spring 26 exerts sufficient downward force on the cup 24 to urge the piston 18 downwardly. Downward movement of the piston 18 continues until the closure member 16 engages the valve seat 15. The poppet 17 will then remain stationary while the piston 18 continues to move downwardly until its lower edge engages the portion of the valve body 10 surrounding the passage 14.

The pressure from the pressure reference spring 26 is thus applied directly to the valve body 10 through the piston 18. There is no pressure exerted on the valve seat 15 at this time or at any time by the pressure reference spring 26. The only pressure which is applied to the valve seat 15 is the pressure exerted by the poppet return spring 19.

Since the piston 18 continues to move downwardly after the poppet 17 is stopped, the balls 20 remain stationary and the openings 21 move downwardly so that the balls 20 are oriented approximately in the center of the openings 21 when the lower edge of the piston 18 engages the valve body 10.

It will thus be seen that a substantially narrow and sharp valve seat may be used because it does not have to be made strong enough to withstand a large amount of closing pressure. Only a small amount of pressure is accordingly required to move the closure member from touch to seal-off and only a minimum amount of seat stress is necessary for sealing.

Figure 3:
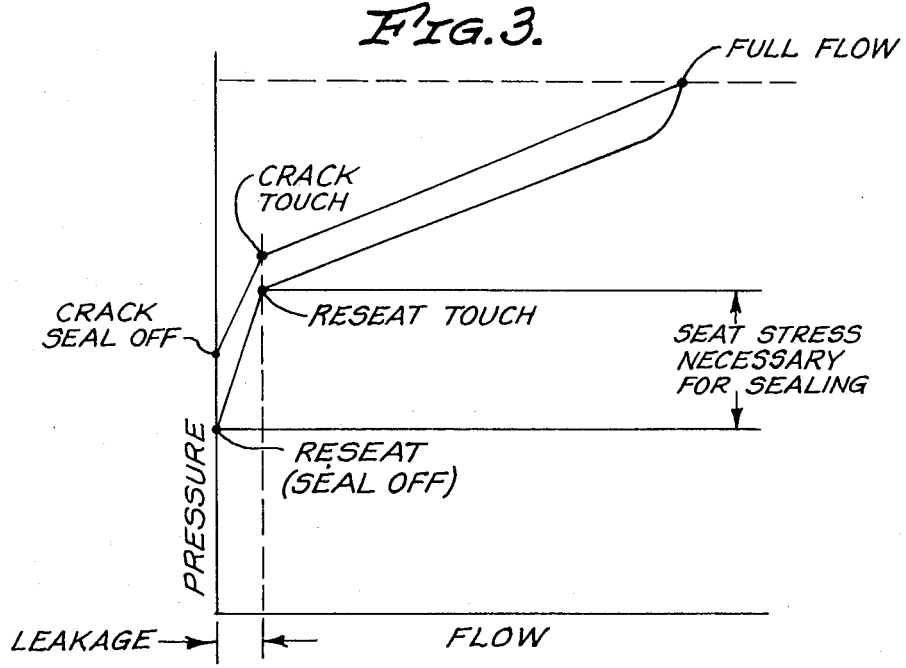
FIG. 3 is a graph showing the relationship between the pressure and flow through the valve and the pressure differentials involved in the operation of the valve.

FIG. 3 is a graph showing the pressures and pressure differentials involved in the operation of the valve.

In order for the closure member to move from touching to sealing position, it must crush the asperities of the valve seat. If the seat is sharp and narrow, less pressure is required to move the closure member from touching to sealing position. With this invention, the valve seat can be made sharp and narrow because it does not have to withstand a substantial amount of pressure. Only a small pressure differential is accordingly required to move from seating position to sealing position.

I claim:

1. A control valve comprising a valve body having an inlet and an outlet, a valve seat surrounding an opening controlling flow from said inlet to said outlet, a poppet having a closure member normally engaging said valve seat, said poppet being mounted for longitudinal movement with respect to a piston, a poppet return spring disposed between portions of said poppet and piston, said poppet return spring urging said poppet away from said piston toward said valve seat, a pressure reference spring acting upon said piston, said pressure reference spring urging said piston into engagement with said valve body, the entire pressure of said reference spring being exerted against said piston and valve body, the only pressure exerted against said valve seat being that of said poppet return spring, and means engageable between said piston and poppet whereby upward movement of said piston moves said poppet upwardly to lift said closure member off said valve seat and open said outlet.

2. The structure described in claim 1, the means engageable between said piston and poppet comprising at least one ball carried by one of said members, said ball being movably mounted in an opening of larger dimension formed in the other of said members.

3. The structure described in claim 2, and a plurality of balls carried by said poppet, said balls extending into openings of larger dimension formed on said piston.

4. The structure described in claim 3, said poppet carrying four balls equally spaced from each other around the periphery of said poppet.

5. The structure described in claim 3, said piston being substantially cylindrical and hollow, said poppet being cylindrical and being reciprocally mounted within the hollow interior of said piston.

6. The structure described in claim 5, said poppet return spring being disposed within said piston and extending between the inside of the upper end of said piston and the upper portion of said poppet.

7. The structure described in claim 6, said piston having a substantially circular lower edge which engages the portion of said valve body surrounding said valve seat.

8. The structure described in claim 7, and an O-ring carried by said valve body and engaging the exterior of said piston to provide a moving seal between said piston and valve body.

* * * * *